US012730032B2

(12) United States Patent
Da Rù et al.

(10) Patent No.: US 12,730,032 B2
(45) Date of Patent: Sep. 8, 2026

(54) METHOD OF DETECTING VIBRATION ANOMALIES IN AN ELECTRONIC DEVICE AND ASSOCIATED SYSTEM

(71) Applicant: KSB SE & Co. KGaA, Frankenthal (DE)

(72) Inventors: Davide Da Rù, Rovolon (IT); Federico Di Santo, Sossano (IT); Gianluca Iabichino, Vicenza (IT)

(73) Assignee: KSB SE & Co. KGaA, Frankenthal (DE)

( * ) Notice: Subject to any disclaimer, the term of this patent is extended or adjusted under 35 U.S.C. 154(b) by 412 days.

(21) Appl. No.: 18/280,598

(22) PCT Filed: Mar. 8, 2022

(86) PCT No.: PCT/IB2022/052033
§ 371 (c)(1),
(2) Date: Sep. 6, 2023

(87) PCT Pub. No.: WO2022/189955
PCT Pub. Date: Sep. 15, 2022

(65) Prior Publication Data

US 2024/0151608 A1 May 9, 2024

(30) Foreign Application Priority Data

Mar. 10, 2021 (IT) ........................ 102021000005615

(51) Int. Cl.
*G01M 7/02* (2006.01)
*G01H 1/00* (2006.01)

(52) U.S. Cl.
CPC ............ *G01M 7/025* (2013.01); *G01H 1/003* (2013.01)

(58) Field of Classification Search
CPC ......... G01M 7/025; G01M 7/00; G01H 1/003
See application file for complete search history.

(56) References Cited

U.S. PATENT DOCUMENTS 10,607,470 B2 * 3/2020 Hayzen .................... G01V 1/00
11,521,105 B2 * 12/2022 Kamiya ............... G06N 3/0895
2016/0054171 A1 * 2/2016 Maalouf ................ G01H 1/006
702/56

FOREIGN PATENT DOCUMENTS

EP 0909380 A1 4/1999
EP 3514389 A1 7/2019

(Continued)

*Primary Examiner* — Ricky Go

(74) *Attorney, Agent, or Firm* — Carmel Patent Agency; Robert Ballarini

(57) ABSTRACT

A method of detecting vibration anomalies in an electronic device, for controlling an electric motor by indicating when mechanical vibrations thresholds are exceeded, includes:

providing a vibration sensor operably associable with an electronic control unit equipped with a memory;

actuating the device and the motor in a learning mode with the motor operating with time-varying currents and speeds;

measuring vibrations for each value of current and speed, measuring instantaneous vibration values and to determine a first set of reference vibration values;

storing the first set of values in the memory;

actuating the device and motor with the motor operating with time-varying currents and speeds;

measuring vibrations for each value of current and speed, to measure the vibration values and to determine a second set of vibration values; and triggering a pre-alarm and alarm signal when a value of the second set exceeds the respective value of the first set.

18 Claims, 3 Drawing Sheets

(56) References Cited

FOREIGN PATENT DOCUMENTS

| | | | |
|---|---|---|---|
| WO | 9749977 | A1 | 12/1997 |
| WO | 9836251 | A1 | 8/1998 |

* cited by examiner

METHOD OF DETECTING VIBRATION ANOMALIES IN AN ELECTRONIC DEVICE AND ASSOCIATED SYSTEM

TECHNICAL FIELD

The present invention generally relates to vibration detection and particularly addresses a method of detecting vibration anomalies in an electronic device for controlling an electric motor or a similar machine.

The invention also relates to a system for detecting vibration anomalies in an electronic device for controlling an electric motor, machine or apparatus exposed to vibration.

BACKGROUND ART

Electronic equipment has been long known to be highly sensitive to excessive vibration deriving, for example, from wrong installation of an electronic device or from neglected maintenance.

Generally, excessive vibration may lead to detachment or unsoldering of the components of the circuit board of the device, thereby causing malfunction and cascading failures.

Typically, vibration protection is provided by applying resin or glue spots to more vibration-sensitive components of the circuit board or by coating the entire board with resin.

Vibration-damping mechanical supports are also known to be applied to the external structure of the electronic device or directly to the circuit board to be protected, with the supports being suitably sized to reduce the mechanical frequencies that are specially detrimental to the electronic components of the device.

Nevertheless, the above solutions are highly expensive and not easily applicable to any type of electronic device due to the mechanical limitations of their construction, the dimensions of the components or the application limits of the device.

Also, other types of vibration phenomena may partially impair the above solutions, such as hardening of the vibration-damping supports due to hardly predictable external environmental phenomena, leading to an increase of vibrations damaging the electronic device.

One example of a hardly predictable vibration phenomenon is the detachment, failure or anomaly of a moving member mechanically coupled to the electronic device, which would increase or exacerbate mechanical vibrations as compared to those admitted by the electronic device, thereby causing its failure.

In an attempt to at least partially obviate these drawbacks, systems have been developed which have at least one vibration sensor associated with an electronic control unit equipped with a memory unit, and which are designed to measure mechanical vibrations and collect a certain amount of data to build a comparative database and predict the mechanical failures of the electronic device to be protected.

Nevertheless, such systems typically rely on massive collection of data stored in memories external to the electronic device, to be protected by means of cloud connections, which limits the monitoring ability to electronic devices having an Internet connection.

Moreover, the accuracy and effectiveness of these systems is directly proportional to the amount of data collected and the consistency of the applications, with minor application differences possibly leading to false alarms.

In order to at least partially obviate these last mentioned drawbacks, vibration anomaly detection methods have been developed which use at least one vibration sensor directly associated with a memory unit installed in the device.

EP3514389 discloses a system and a method as described above for identifying anomalous vibrations of a motor unit connected to a pump and powered by an electronic device, e.g. an inverter.

The system comprises a plurality of vibration sensors for detecting at least one of the vibrations of the pump, the electric motor and the inverter. A control unit connected to a memory unit is also provided to store the readings measured by the sensors.

The vibration identification method implemented by the control unit includes a first step of gradually increasing the rotation speed of the pump motor to a predetermined rotation speed to store the vibration values as measured by the sensors.

At this stage, the control unit gradually increases the frequency of the inverter to a maximum frequency, with predetermined frequency intervals, and stores the vibration value at each interval after waiting a predetermined time for the frequency of the inverter to become stable, to subsequently determine threshold vibration value for the corresponding frequency of operation of the pump.

Hence, during normal operation of the motor, the control unit analyzes the vibrations as measured by the sensors and when at least one of the measured vibration values exceeds its threshold value for a longer time than the predetermined interval, the control unit indicates an abnormal vibration.

Furthermore, each threshold vibration value comprises a minimum value and a maximum value for each of the sensors, to thereby determine a vibration range in which vibrations are admitted and avoid false alarms. These maximum and minimum threshold values are determined by adding or multiplying a numerical factor to or by the stored values Thus, when at least one of the vibration values as measured by the vibration sensors is above the maximum threshold value, the control unit issues an alarm to indicate an abnormal vibration and stops the operation of the motor. On the other hand, when all the measured vibration values are below the maximum threshold value and at least one of the measured vibration values is above the minimum threshold value, the control unit detects an abnormal vibration and issues an alarm without stopping the operation of the motor.

A first drawback of this known solution is that vibration measurement to determine the threshold values is carried out at predetermined frequency intervals and at a predetermined sample time and does account for any changes to the load applied to the electric motor.

As a result, this solution prevents detection of excessive vibration caused by wrong installation of the electronic device or neglected maintenance, and cannot be used with equipment having heterogeneous work cycles and/or loads.

Technical Problem

In light of the prior art, the technical problem addressed by the present invention is to afford intelligent detection of any vibration anomaly in an electronic device and provide indication of abnormal operation and malfunctioning while avoiding false alarms and providing preventive maintenance.

DISCLOSURE OF THE INVENTION

The object of the present invention is to obviate the above discussed drawbacks, by providing a method and a system for detecting vibration anomalies of an electronic device for controlling an electric motor, that are highly efficient and cost-effective.

A particular object of the present invention is to provide a method and a system for detecting vibration anomalies as described above, that avoid false alarms.

Another object of the present invention is to provide a method and a system for detecting vibration anomalies as described above that can recognize excessive vibration caused by wrong installation of the electronic device or by neglected maintenance.

A further object of the present invention is to provide a method and a system for detecting vibration anomalies as described above that afford monitoring of electronic devices with no Internet connection.

A further object of the present invention is to provide a method and a system for detecting vibration anomalies as described above even under hardly predictable external environmental phenomena.

A further object of the present invention is to provide a method and a system for detecting vibration anomalies as described above that can identify a pre-alarm threshold and a stop threshold for stopping mechanical vibrations incompatible with the electronic circuits of the device and with the relevant application.

Another object of the present invention is to provide a method and a system for detecting vibration anomalies as described above that afford collection of vibration data for the single application that monitors the electronic device.

A further object of the present invention is to provide a method and a system for detecting vibration anomalies as described above that can be used with equipment having variable work cycles and loads.

These and other objects, as more clearly explained hereafter, are fulfilled by a method of detecting vibration anomalies of an electronic device for controlling an electric motor or a similar machine, by indicating when predetermined thresholds corresponding to mechanical vibrations incompatible with the relevant application are exceeded, as defined in claim 1.

The method of the invention includes the following steps:

a) providing a vibration sensor operably associable with an electronic control unit equipped with a memory unit;
b) actuating the electronic device and the electric motor in a learning mode, with the motor operating with time-varying currents and speeds;
c) measuring vibrations by the sensor, for each current and speed value, to measure instantaneous vibration values and to determine a first set of reference vibration values for thresholds corresponding to mechanical vibrations incompatible with the relevant application;
d) storing the first set of reference values in the memory unit;
e) actuating the electronic device in a supervision mode and actuating the electric motor in an operating mode in which the motor operates with time-varying currents and speeds;
f) measuring vibrations by the sensor, for each current and speed value, to measure instantaneous vibration values and to determine a second set of operating vibration values;
g) triggering a pre-alarm and alarm signal by the electronic control unit as a vibration value of the second set of values exceeds the respective vibration value of the first set of reference values.

This combination of features affords detection of excessive vibration caused by wrong installation of the electronic device or by neglected maintenance, or under unpredicted external environmental phenomena.

Advantageously, the step of measuring in supervision mode, is followed by a step of determining a first pre-alarm deviation coefficient and a second alarm deviation coefficient which will be multiplied by each instantaneous vibration value that has been stored, to determine a measurement error in the step of measuring in supervision mode and to avoid false alarms.

The invention also relates to a system for detecting vibration anomalies of an electronic device for controlling an electric motor, machine or apparatus, as defined in claim 10.

Advantageous embodiments of the invention are as defined in the dependent claims.

BRIEF DESCRIPTION OF THE DRAWINGS

Further features and advantages of the invention will be more apparent from the detailed description of a preferred, non-exclusive embodiment of a method and a system for detecting vibration anomalies in an electronic device for controlling an electric motor, as discussed above, which is described as a non-limiting example with the help of the annexed drawings, in which.

DETAILED DESCRIPTION OF A PREFERRED EXEMPLARY EMBODIMENT

Figure 1:
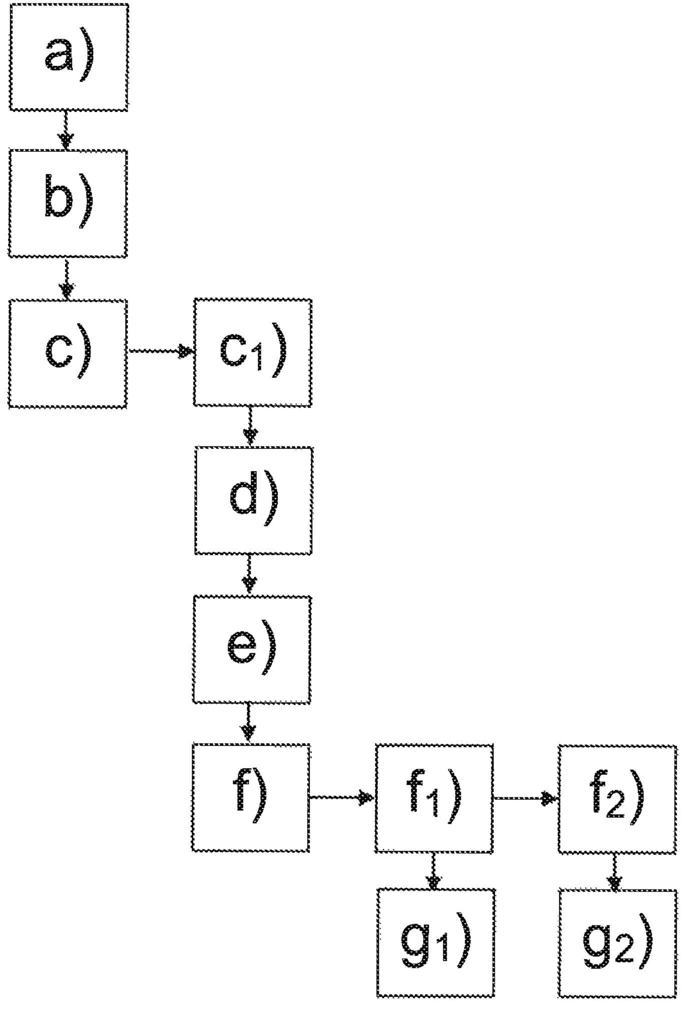
FIG. 1 is a block diagram of the inventive method.

Particularly referring to the figures, there is shown a method of detecting vibration anomalies of an electronic device D for controlling an electric motor M or similar machine by indicating when predetermined thresholds corresponding to mechanical vibrations incompatible with the relevant application are exceeded, as best shown in FIG. 1.

As used herein, "electronic device" refers to any device having an electronic circuit with power and/or signal elements, such as an inverter, a power driver or a similar apparatus, intended for regulating the current, frequency or rotation speed of an electric motor.

Figure 2:
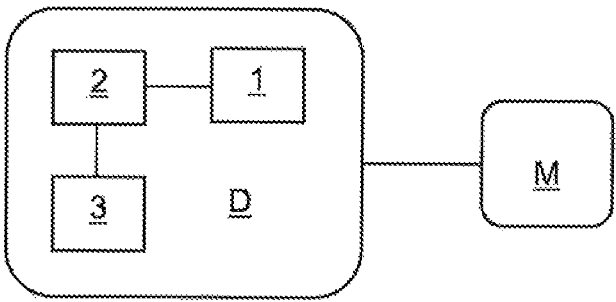
FIG. 2 is a schematic view of the system and the step a) of the method of FIG. 1.

The method includes a first step a) of providing at least one vibration sensor 1 operably associable with an electronic control unit 2 equipped with a memory unit 3, as shown in FIG. 2.

Preferably, the vibration sensor 1, the electronic control unit 2 and the memory unit 3 will be installed in the electronic circuit of the device D. Nevertheless, this does not exclude that such components may be installed in an electric circuit external to the electronic device D as long as it is directly connected thereto.

As a non-limiting example, the vibration sensor 1 may be a direct- or indirect-detection sensor, or a pre-calibrated vibration sensor intended to detect certain oscillation frequencies, or a sensor constructed for purposes other than the use of the inventive method, such as a microphone used to detect mechanical vibrations at high oscillation frequency.

The step a) is followed by a step b) of actuating the electronic device D and actuating the electric motor M in a learning or observation mode, with the motor M operating with time-varying currents $i_A$ and speeds $w_A$ In this second step b) of actuating the electronic device D in the learning mode, the electronic control unit 2 automatically defines a working area of the electric motor M as a function of the current $i_A$ and speed $w_A$ of the motor M.

Figure 3:
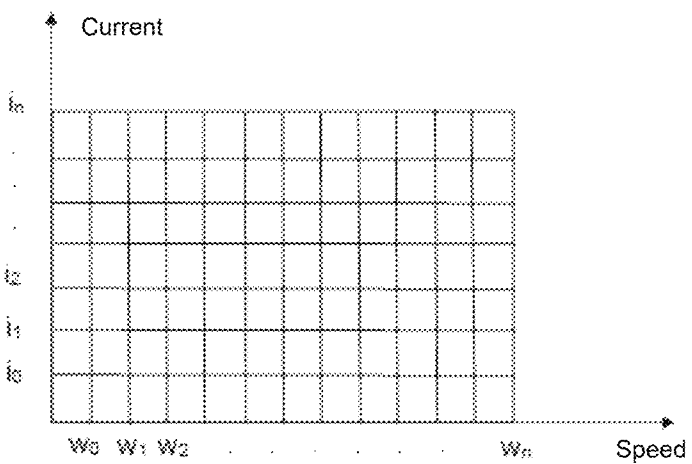
FIG. 3 schematically shows the working area and the sub-zone division of step b) of the method of FIG. 1.

As schematically shown in FIG. 3, the working area is divided into sub-zones to form a two-dimensional grid.

Then, for each value of current $i_A$ and speed $w_A$ and hence for each sub-zone of the two-dimensional grid, a step is carried out, consisting in measuring the vibrations by the sensor 1 to measure the instantaneous vibration values $v_A$ of the electronic device D.

Such instantaneous measurements $v_A$ will provide a first set of reference vibration values $v_{A(i,w)}$ to determine the thresholds corresponding to mechanical vibrations unacceptable to the electronic circuits of the device D.

Advantageously, the step c) of measuring is carried out for a predetermined time that can be adjusted by a user of the electronic device D.

Then, a step d) of storing the first set of reference vibration values $v_{A(i,w)}$ in the memory unit 3 is provided.

By this arrangement, the collection of vibration data is centralized in the memory unit 3 which affords monitoring of the electronic device D and the motor M even in remote systems or in areas with no Internet coverage.

Figure 4:
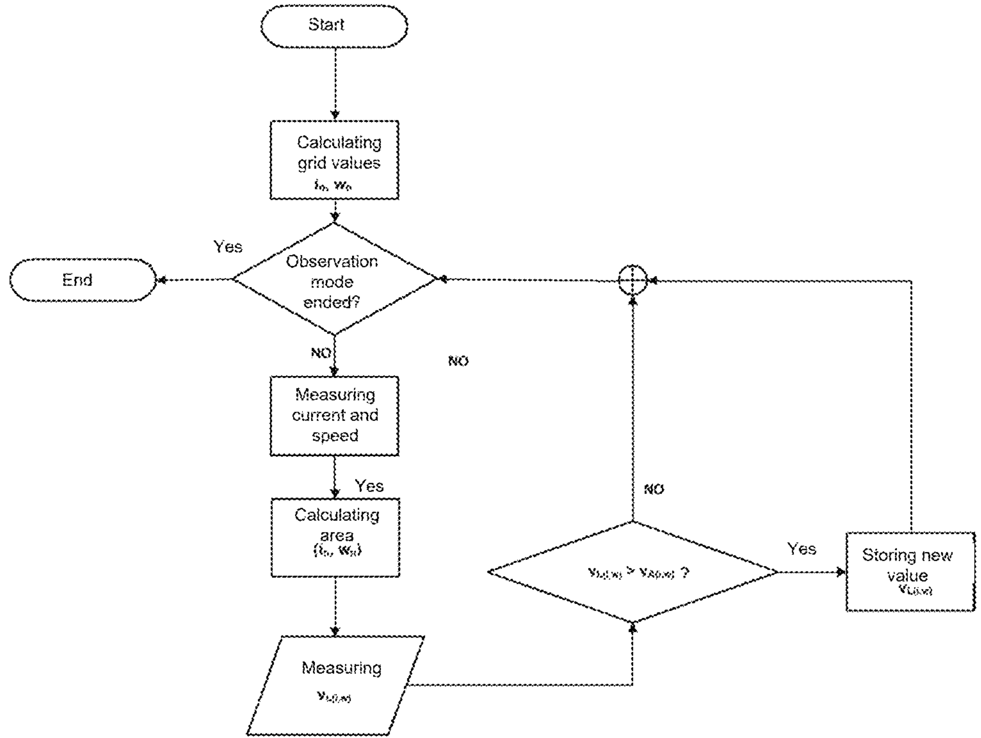
FIGS. 4 and 5 show block diagrams of steps a)-d) and steps e)-$g_2$) respectively, of the method of FIG. 1.

As best shown in the block diagram of FIG. 4, which illustrates the steps a)-d) of the inventive method, for each value of current $i_A$ and speed $w_A$ and hence for each sub-zone of the two-dimensional grid, the only vibration values $v_A$ stored in step d) will be those higher than those previously stored, to avoid overlapping or repeated vibration values $v_A$ within a given sub-zone of the two-dimensional grid. This will avoid massive collection of data.

The step c) of measuring in the learning mode is followed by a step $c_1$) of predetermining a maximum persistence time $t_A$ of each instantaneous vibration $v_A$ of the first set of reference vibration values $v_{A(i,w)}$.

Once the step $c_1$) of predetermining has been carried out, the learning mode of the electronic device D and the electric motor M as described in the previous steps b)-d) ends.

As an alternative to steps b)-c) of the method and to the learning mode, the vibration values $v_A$ of the first set of reference vibration values $v_{A(i,w)}$ may be predetermined and stored in the memory unit 3.

The next step e) consists in actuating the electronic device D in the supervision mode and actuating the electric motor M in the operating mode, with the motor M operating with time-varying currents $i_L$ and speeds $w_L$.

Then, for each value of current $i_L$ and speed $w_L$ of the electric motor M, a step f) is provided consisting of measuring vibrations by the sensor 1 to measure instantaneous vibration values $v_L$ and to determine a second set of vibration values $v_{L(i,w)}$.

This step f) is followed by the comparison of the values of the second set of vibration values $v_{L(i,w)}$ with the values of the first set of reference vibration values $v_{A(i,w)}$ as stored in the memory unit 3.

When a vibration value $v_L$ of the second set of values $v_{L(i,w)}$ exceeds the respective vibration value $v_A$ of the first set of reference vibration values $v_{A(i,w)}$, a step g) is provided consisting in triggering a pre-alarm and alarm signal by the electronic control unit 2.

As used herein, "pre-alarm" refers to a warning aimed at avoiding downtime and useful to request a check on the electronic device D and/or the electric motor M by the personnel.

It will be appreciated that the method as described heretofore is able to calibrate the monitored system on the specific application. That is, it can check whether the vibrations $v_L$ as measured are higher than those expected and stored during step d). Also, this does not exclude that the system may detect vibrations during the operating mode that are not harmful to the electronics and its components, but in any case higher than those predicted by the relevant application. In this case, a pre-alarm and an alarm are generated.

In particular, the step f) of measuring in the operating mode is followed by a step $f_1$) of predetermining a first pre-alarm deviation coefficient $k_1$ and a second alarm deviation coefficient $k_2$ which will be multiplied by each instantaneous vibration value $v_A$ of the first set of reference vibration values $v_{A(i,w)}$ to determine an error measurement in step f) and avoid false alarms.

Therefore, the deviation coefficients $k_1$, $k_2$ will be used by the control unit 2 to predetermine acceptance windows, for example in percent form, where the vibration deviations $v_L$ of the second set of values $v_{L(i,w)}$ that fall within the window range that can be determined by the relations $k_1 \cdot v_{A(i,w)}$ and $k_2 \cdot v_{A(i,w)}$ will be deemed to be acceptable, even though the vibration values $v_L$ of the second set of values $v_{L(i,w)}$ exceed the instantaneous vibration values $v_A$ of the first set of values $v_{A(i,w)}$.

For this purpose, the step g) of triggering comprises a step $g_1$) of triggering a pre-alarm when a vibration value $v_L$ of the second set of values $v_{L(i,w)}$ satisfies the relation $k_1 \cdot v_{A(i,w)} < v_{L(i,w)} < k_2 \cdot v_{A(i,w)}$, and triggering an alarm signal when a vibration value $v_L$ of the second set of values $v_{L(i,w)}$ satisfies the relation $v_{A(i,w)} < k_2 \cdot v_{A(i,w)} < v_{L(i,w)}$.

Moreover, the step f) of measuring in the operating mode, is also followed by a step $f_2$) of measuring the persistence time $t_{L(i,w)}$ for each vibration value of the second set of values $v_{L(i,w)}$ by the vibration sensor 1. That is, the step g) of triggering comprises a step $g_2$) of stopping the electric motor M if a vibration value of the second set of values $v_{L(i,w)}$ exceeds its respective vibration value $k_2 \cdot v_{A(i,w)}$ and if it has a persistence time to m) that exceeds the maximum persistence time value $t_A$.

Conversely, if the vibrations $v_L$ of the second set of values $v_{L(i,w)}$ exceed the instantaneous vibration values $v_A$ of the first set of values $v_{A(i,w)}$ for a persistence time $t_{L(i,w)}$ exceeding the maximum persistence time $t_A$, even if their value $v_L$ is within the range that can be determined by the relation $k_1 \cdot v_{A(i,w)} < v_{L(i,w)} < k_2 \cdot v_{A(i,w)}$, a pre-alarm signal is generated.

Thus, the above steps $g_1$) and $g_2$) can provide preventive maintenance before any disastrous events might damage or permanently jeopardize the operation of the electronic device D and the electric motor M.

Figure 5:
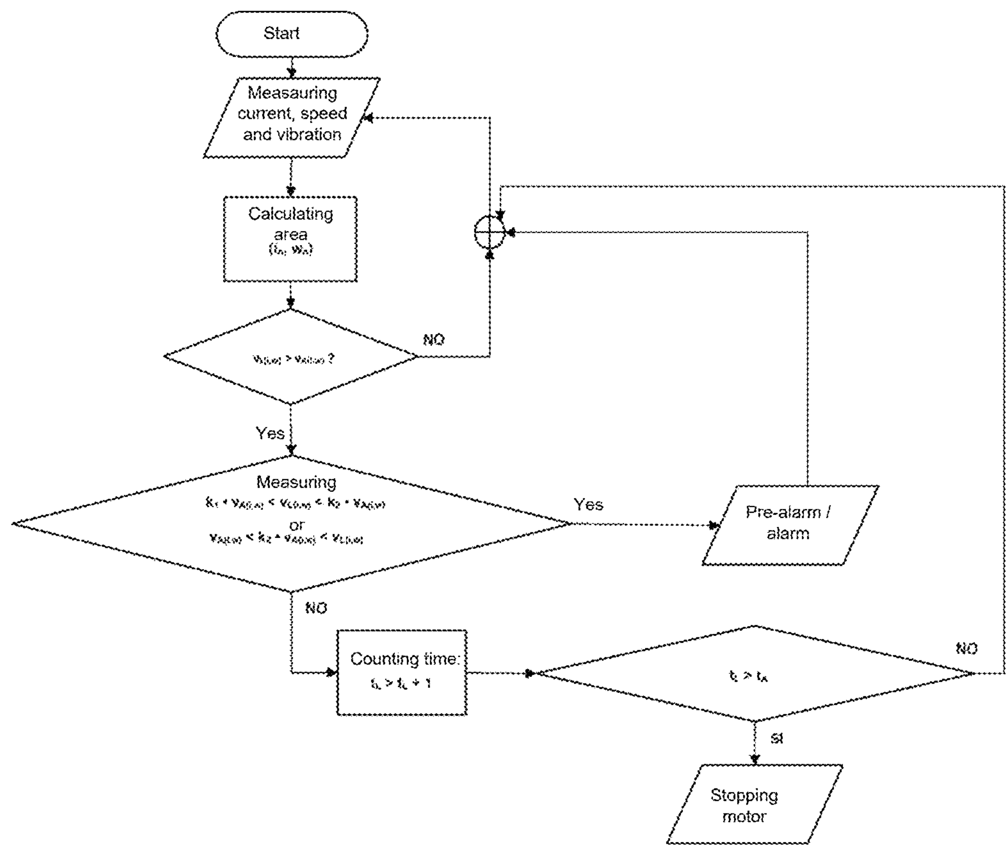

The block diagram of FIG. 5 schematically shows the steps e)-$g_2$) of the inventive method.

Advantageously, a computer program is installed in the control unit 2 comprising program codes adapted to carry out the steps b)-$g_2$) of the method.

Figure 6:
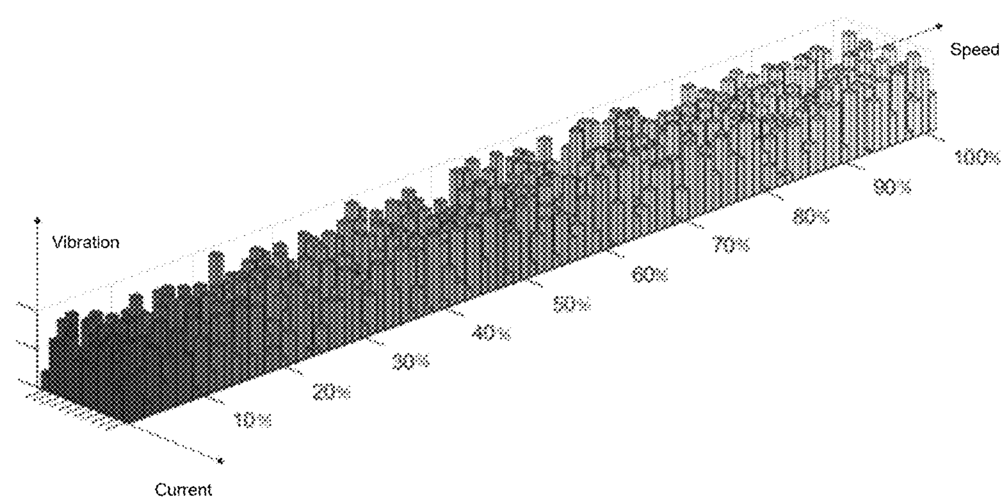
FIG. 6 is a schematic view of a display of the vibration values as measured in steps c) and f) of the method of FIG. 1.

The program is also adapted to visually represent the first $v_{A(i,w)}$ and the second sets of values $v_{L(i,w)}$ by a three-dimensional graph, as schematically shown in FIG. 6, to automatically or manually display the values as measured in the measuring steps c) and f), and check the installation efficiency of the electronic device D and the electric motor M.

It will be appreciated that the method of the invention can recognize the presence of excessive vibrations detrimental to the electronic circuits of the device D, which can be caused by wrong installation and by neglected maintenance of the electronic device D and/or the electric motor M, or by hardly predictable or totally unpredictable external environmental phenomena.

Furthermore, the steps e)-$g_2$) are carried out each time the electronic device D is powered on, to allow vibration anomaly detection for each individual application of the electronic device of interest.

In a further aspect, the invention provides a system for detecting vibration anomalies of an electronic device D for controlling an electric motor M or machine or apparatus exposed to vibration, with the system comprising a vibration sensor 1 operably connected to an electronic memory 3 and to an electronic control unit 2 as described above.

It will be appreciated from the foregoing that the method and the system for detecting vibration anomalies of an electronic device for controlling an electric motor according to the invention fulfill the intended objects and namely allow indication of any abnormal operation and malfunctioning while avoiding false alarms and providing preventive maintenance.

The method and system of the invention are susceptible to a number of changes or variants, within the inventive concept disclosed in the appended claims.

While the method and system have been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or member that is being described is included in at least one embodiment of the inventive subject matter.

Furthermore, the particular characteristics, structures or members may be combined together in any suitable manner to provide one or more embodiments.

INDUSTRIAL APPLICABILITY

The present invention may find application in industry, because it can be produced on an industrial scale in factories manufacturing electronic control devices and electric motors.

The invention claimed is:

1. A method of detecting vibration anomalies in an electronic device (D) for controlling an electric motor (M) by indicating when predetermined thresholds corresponding to mechanical vibrations incompatible with the relevant application are exceeded, the method comprising:

a) providing a vibration sensor (1) operably associable with an electronic control unit (2) equipped with a memory unit (3);

b) actuating the electronic device (D) and the electric motor (M) in a learning mode, with the motor (M) operating with time-varying currents ($I_A$) and speeds ($W_A$);

c) measuring vibrations by said sensor (1), for each value of current ($i_A$) and speed ($W_A$), to measure instantaneous vibration values ($V_A$) and to determine a first set of reference vibration values ($V_{A(i,w)}$);

d) storing said first set of reference values ($V_{A(i,w)}$) in said memory unit (3);

e) actuating the electronic device (D) in a supervision mode and actuating the electric motor (M) in an operating mode, with the motor (M) operating with time-varying currents ($I_L$) and speeds ($W_L$), f) measuring vibrations by said sensor (1), for each value of current ($i_L$) and speed ($W_L$), to measure instantaneous vibration values ($V_L$) and to determine a second set of operating vibration values ($V_{L(i,w)}$);

f2) predetermining a first pre-alarm deviation coefficient (k1) and a second alarm deviation coefficient (k2) that can be multiplied by each instantaneous vibration value (vA), to determine a measurement error in said step f); and g) triggering a pre-alarm and alarm signal by said electronic control unit (2) as a vibration value ($V_L$) of said second set of values ($V_{L(i,w)}$) exceeds the respective vibration value ($V_A$) of said first set of reference values ($V_{A(i,w)}$).

2. The method as claimed in claim 1, wherein said step g) of triggering comprises a step of $g_1$) triggering a pre-alarm when a vibration value ($V_L$) of said second set of values ($v_{L(i,w)}$) satisfies the relation $k_1 \cdot v_{A(i,w)} < v_{L(i,w)} < k_2 \cdot v_{A(i,w)}$, and triggering an alarm when a vibration value ($V_L$) of said second set of values ($V_{L(i,w)}$) satisfies the relation $v_{A(i,w)} < k_2 \cdot v_{A(i,w)} < v_{L(i,w)}$.

3. The method as claimed in claim 2, wherein said step g) of triggering comprises a step of $g_2$) stopping the electric motor (M) if a vibration value ($V_L$) of said second set of values ($V_{L(i,w)}$) exceeds its respective vibration value $k_2 \cdot v_{A(i,w)}$ and if it has a persistence time ($t_{L(i,w)}$) that exceeds said maximum persistence time value ($t_A$).

4. The method as claimed in claim 2, wherein said steps e)-g1) are carried out each time the electronic device (D) is powered on.

5. The method as claimed in claim 1, wherein said step c) of measuring in the learning mode is followed by a step of $C_1$) predetermining a maximum persistence time ($t_A$) of each instantaneous vibration ($V_A$) of said first set of reference vibration values ($V_{A(i,w)}$).

6. The method as claimed in claim 5, wherein said step g) of triggering comprises a step of $g_2$) stopping the electric motor (M) if a vibration value ($v_L$) of said second set of values ($v_{L(i,w)}$) exceeds its respective vibration value $k_2 \cdot v_{A(i,w}$ and if it has a persistence time ($t_{L(i,w)}$) that exceeds said maximum persistence time value ($t_A$).

7. The method as claimed in claim 5, wherein said steps e)-g) are carried out each time the electronic device (D) is powered on.

8. The method as claimed in claim 1, wherein said step f) of measuring in the operating mode is followed by a step of $f_2$) measuring the persistence time ($t_{L(i,w)}$) for each vibration value of said second set of values ($V_{L(i,w)}$) by said vibration sensor (1).

9. The method as claimed in claim 8, wherein said step g) of triggering comprises a step of $g_2$) stopping the electric motor (M) if a vibration value ($v_L$) of said second set of values ($v_{L(i,w)}$) exceeds its respective vibration value $k_2 \cdot v_{A(i,w}$ and if it has a persistence time ($t_{L(i,w)}$) that exceeds said maximum persistence time value ($t_A$).

10. The method as claimed in claim 8, wherein said steps e)-g) are carried out each time the electronic device (D) is powered on.

11. The method as claimed in claim 1, wherein a computer program is installed in said control unit (2), for visually representing said first ($V_{A(i,w)}$) and said second sets of values ($V_{L(i,w)}$) in a three-dimensional graph to display the values as measured in said measuring steps c) and f), and check the installation of said electronic device (D) and said electric motor (M).

12. The method as claimed in claim 11, wherein said steps e)-g) are carried out each time the electronic device (D) is powered on.

13. The method as claimed in claim 1, wherein said step c) of measuring is carried out for a predetermined and adjustable time.

14. The method as claimed in claim 1, wherein said steps e)-g) are carried out each time the electronic device (D) is powered on.

15. A system for detecting vibration anomalies of an electronic device (D) for controlling an electric motor (M) or machine or apparatus exposed to vibrations, wherein the system comprises a vibration sensor (1) operably connected to an electronic memory unit (3) and to an electronic control unit (2), configured to operate according to the method as claimed in claim 1.

16. The method as claimed in claim 1, wherein said step g) of triggering comprises a step of $g_2$) stopping the electric motor (M) if a vibration value ($V_L$) of said second set of values ($V_{L(i,w)}$) exceeds its respective vibration value $k_2 \cdot v_{A(i,w)}$ and has a persistence time ($t_{L(i,w)}$) that exceeds said maximum persistence time value ($t_A$).

17. A method of detecting vibration anomalies in an electronic device (D) for controlling an electric motor (M) by indicating when predetermined thresholds corresponding to mechanical vibrations incompatible with the relevant application are exceeded, the method comprising:

a) providing a vibration sensor (1) operably associable with an electronic control unit (2) equipped with a memory unit (3);

b) actuating the electronic device (D) and the electric motor (M) in a learning mode, with the motor (M) operating with time-varying currents ($I_A$) and speeds ($W_A$);

c) measuring vibrations by said sensor (1), for each value of current ($i_A$) and speed ($W_A$), to measure instantaneous vibration values ($V_A$) and to determine a first set of reference vibration values ($V_{A(i,w)}$);

d) storing said first set of reference values ($V_{A(i,w)}$ in said memory unit (3);

e) actuating the electronic device (D) in a supervision mode and actuating the electric motor (M) in an operating mode, with the motor (M) operating with time-varying currents ($i_L$) and speeds ($w_L$), f) measuring vibrations by said sensor (1), for each value of current ($I_L$) and speed ($w_L$), to measure instantaneous vibration values ($v_L$) and to determine a second set of operating vibration values ($V_{L(i,w)}$;

g) triggering a pre-alarm and alarm signal by said electronic control unit (2) as a vibration value ($v_L$) of said second set of values ($V_{L(i,w)}$) exceeds the respective vibration value ($V_A$) of said first set of reference values ($V_{A(i,w)}$; and $g_2$) stopping the electric motor (M) if a vibration value ($V_L$) of said second set of values ($V_{L(i,w)}$) exceeds its respective vibration value $K_2 \cdot V_{A(i,w)}$ and if it has a persistence time ($t_{L(i,w)}$) that exceeds said maximum persistence time value ($t_A$).

18. The method as claimed in claim 17, wherein said steps e)-g2) are carried out each time the electronic device (D) is powered on.

* * * * *